(12) United States Patent
Asbeck et al.

(10) Patent No.: US 7,815,510 B2
(45) Date of Patent: Oct. 19, 2010

(54) TORSION VIBRATION DAMPING DEVICE

(75) Inventors: Jochen Asbeck, Attendorn (DE);
Michael Schebitz, Attendorn (DE);
Vladimir Kobelev, Attendorn (DE);
Stefan Schattenberg, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 778 days.

(21) Appl. No.: 11/514,066

(22) Filed: Aug. 31, 2006

(65) Prior Publication Data

US 2007/0060395 A1    Mar. 15, 2007

(30) Foreign Application Priority Data

Sep. 1, 2005  (DE) .................. 10 2005 041 674
Nov. 16, 2005 (DE) .................. 10 2005 055 034

(51) Int. Cl.
*F16D 3/52*    (2006.01)

(52) U.S. Cl. ...................... 464/58; 464/59; 474/902

(58) Field of Classification Search .................. 464/51, 464/56–60, 611, 62.1, 64.1, 77, 160, 61.1; 474/902

See application file for complete search history.

(56) References Cited

U.S. PATENT DOCUMENTS

| 1,472,782 | A | * | 11/1923 | Barber ..................... 464/58 |
| 1,985,296 | A |   | 12/1934 | Meyer |
| 3,726,133 | A | * | 4/1973  | Morgan ................. 464/58 X |
| 4,257,500 | A |   | 3/1981  | Brunner |
| 4,934,990 | A | * | 6/1990  | Backers .................. 464/57 X |

FOREIGN PATENT DOCUMENTS

| DE | 197 49 421 C2  |   | 8/2000 |
| DE | 602 00 178 T2  |   | 9/2004 |
| EP | 0 782 674 B1   |   | 4/1999 |
| EP | 1279807 A1     | * | 1/2003 |

* cited by examiner

*Primary Examiner*—Greg Binda (57) ABSTRACT

A driving disc with a hub and a disc rim which are rotatably supported inside one another, with at least two wound wire springs which are mounted substantially coaxially relative to the hub and disc rim and whose one end is secured in the direction of rotation relative to the hub and whose respective other end is secured in the direction or rotation relative to the disc rim.

23 Claims, 6 Drawing Sheets

TORSION VIBRATION DAMPING DEVICE

FIELD OF THE INVENTION

The invention relates to a driving disc having a torsion vibration damping characteristic which includes a hub and a disc rim which are connected to one another via a spring and damping element. Drive force can be transmitted from the disc rim to the hub or from the hub to the disc rim. The hub can be threaded to a driveshaft. The driveshaft can be a crankshaft or a camshaft of an internal combustion engine, for example, with subsidiary drives being driven via the driving disc. Because of the periodic mode of operation of internal combustion engines or even of piston compressors, the shaft ends of such machines are subject to irregularities in respect to the angular speed and torque, which irregularities can be intensified further by vibration and resonance symptoms of the shafts.

BACKGROUND OF THE INVENTION

In order to dampen irregularities in the drive leading to the subsidiary drives, prior art driving discs are commonly provided with spring and damping elements made of elastomer products which combine a spring and damping effect in one component (DE 197 49 421 C2).

Elastomer, when used as a material for spring and damping elements, comprises a number of disadvantages. The stiffness and thus the natural frequency of the spring and damping element greatly depends on the ambient temperature, which adversely affects the damping effect when the ambient temperature changes. Apart from external influences, the ambient temperature changes even as a result of the internal damping over time.

Elastomer is also susceptible to environmental influences; more particularly, it can be attacked by aggressive fluids or oils as well as gases which occur in internal combustion engines.

The damping characteristics of an elastomer are primarily dependent on the properties of the elastomer, which properties can be varied to a limited extent only. In addition, the spring and damping elements made of elastomer require a relatively large installation space.

In EP 0 782 674 B1, a driving disc is provided in the form of a crankshaft decoupling device wherein a spring disc is fixed to a mounted hub and a belt pulley. In addition, curved helical springs are arranged circumferentially extending and mounted without a pretension, and which extend in the same circumferential direction between the driving disc and the belt pulley. The driving disc is combined with a slip coupling switched to operate in a specific direction.

DE 602 00 178 T2 provides a belt pulley unit, for an internal combustion engine wherein the coupling means are provided in the form of one or two metallic spiral springs between a hub and an annular element for the belt seat. The coupling means exhibits a different behavior as a function of the tendency of the hub to rotate faster or more slowly than the annular element. The coupling means provide a flexible coupling with an increasing stiffness as a consequence of an increasing tendency of the hub to rotate faster than the annular element. In addition, the coupling means has a tendency to disconnect the hub from the annular element with an increasing tendency of the hub to rotate more slowly than the annular element. In the latter case, the spiral springs are completely load-relieved, so that noise develops at their points of support.

OBJECT OF THE INVENTION

It is an object of the present invention to provide a driving disc of the above-mentioned type which is compact, operates at a low noise level and comprises continuously good and freely selectable spring and damping properties. One objective is achieved by providing a driving disc with a hub and a disc rim which are rotatably supported inside one another. At least two wound wire springs are mounted substantially coaxially relative to the hub and disc rim; wherein one end is secured in the direction of rotation relative to the hub, and the other end is secured in the direction of rotation relative to the disc rim. The two wire springs are wound in opposite directions and are mounted so as to be pretensioned relative to one another.

By using at least two wire springs wound coaxially relative to the axis of rotation inside the driving disc, it is possible to achieve a very compact design. This device largely disconnects the effect of the spring and of the damping device in that the springs comprise a relatively low internal damping effect and in that there can be provided friction faces at the hub and disc rim for setting the damping level. Wire springs ensure a long service life which remains largely unaffected by the ambient temperature and other environmental influences. The number of components is small and permits a simple, purely axial assembly procedure. Because of the metallic material, heat dissipation is not a significant problem

SUMMARY OF THE INVENTION

In accordance with the invention, at least two wire springs are wound in opposite directions and are mounted so as to be pretensioned relative to one another. The springs, by means of their ends, can be supported on the hub and disc rim respectively in such a way that a form-fitting effect occurs in one direction of rotation only. Even in the case of a maximum rotation of the hub and disc rim relative to one another, there should still be pretension in both wire springs so that the form-fitting and positive contact at both wire springs is permanently maintained.

Instead of the two above-mentioned springs, it is also possible to use and mount with pretension two groups of springs in the way described here. The spring ends can be butt-cut and can be supported on corresponding rotational stops at the hub and/or in the disc rim.

In another embodiment, at least one of the ends of the at least two wire springs is bent in an axis-parallel or radial way with respect to the hub and disc rim for the purpose of being form fittingly and positively secured in one of the parts, such as in the hub or the disc rim. This means that the spring ends can be suitably suspended in simple axial bores.

According to a further embodiment, the at least two wire springs are wound spiral-like in one plane; even if use is made of two wire springs mounted in opposite directions, a very short construction is achieved. The wire springs can have a plurality of spiral windings positioned inside one another.

According to another embodiment, the hub is composed of a dish-shaped part and a cover or of two dish-shaped parts which are symmetric relative to one another, and encloses two wound wire springs, wherein one end of each of the wire springs passes through the hub and is connected to the disc rim. In this way, the wire springs can be protected against dirt so that the damping properties do not change.

In another embodiment, oblong holes are provided in the hub through which one of the ends of the wire springs may be passed to be secured in the disc rim. This permits a relative rotational movement in both circumferential directions, starting from a central position. For setting the damping properties, it is possible to provide intermediate discs and supporting discs which are positioned between the wire springs and/or the wire springs can be axially supported inside the hub. Similar to the hub, the disc rim can also be composed of a dish-shaped part and a cover, and enclose the hub as a whole at its end circumferentially. A belt pulley on the dish-shaped part can be provided for a V-belt, a toothed belt or a chain wheel, either directly or as a slipped-on part.

Sliding disc can be inserted between the end faces of the hub and the disc rim. Furthermore, a sliding or friction sleeve can be used between the circumferential face of the hub and the disc rim. These parts, which can consist of plastics for example, serve to set the no-play condition and be used to vary the damping effect.

According to a further embodiment, the hub can be composed of a dish-shaped part and an annular-cover-shaped part, wherein the annular-cover-shaped part is positioned on the outside of the dish-shaped part in such a way that the hub forms an annular groove in which the wire springs are positioned. In addition, the disc rim can comprise a guiding disc, which engages the annular groove in the hub, and a cylindrical ring which, together with the annular groove, forms two annular chambers that are separated from the annular disc and in which the two wire springs are positioned. The wire springs can be directly supported on rotational stops on the hub on the one hand, and on the disc rim, on the other hand, without having to pass through one of the two parts. The two parts of the hub may be mounted after the wire springs and the disc rim have been slid onto the dish portion of the dish-shaped part. The disc-shaped part as well as the annular-cover-shaped part can be produced in the form of multiple-step deep drawn parts of metal plate which, if viewed in one direction, are undercut-free.

Between the hub and the disc rim, at least one sliding or friction sleeve can be provided for setting the damping properties, wherein the sliding or friction sleeve can enclose the guiding disc inside or laterally.

The two wire springs are normally wound out of round wire. The hub can be threaded to a shaft journal or alternatively to a shaft, wherein the threading means can also serve to connect the two parts of the hub. For this purpose, the hub can be provided with a simple inner flange which is formed of the two parts.

In order to ensure a connection with the adjoining shaft journal in spite of a small threading face of the inner flange of the hub, the respective flange face can be provided at the hub with end teeth, such as Hirth teeth, which can cooperate with the corresponding counter teeth at the end face of the shaft journal to be connected. This connection can be torque-loaded in spite of a small threading face of the inner flange of the hub. A central screw can be provided for mutual clamping purposes which is passed through the inner flange and is threaded centrally into the end of the shaft journal.

For influencing the vibration behavior of the shaft, and specifically for absorbing high-frequency vibrations, an annular absorber mass can be connected via a damping rubber to the hub, which connection is capable of vibrating.

Preferred embodiments of the invention are illustrated in the drawings and will be described below.

BRIEF DESCRIPTION OF THE DRAWINGS

FIG. 2b illustrates a driving disc according to FIG. 1 in the form of a detail in a longitudinal section AA according to FIG. 2a.

FIG. 5b illustrates a driving disc in a third embodiment in the form of a detail in a longitudinal section according to FIG. 5a.

DETAILED DESCRIPTION

Figure 1:
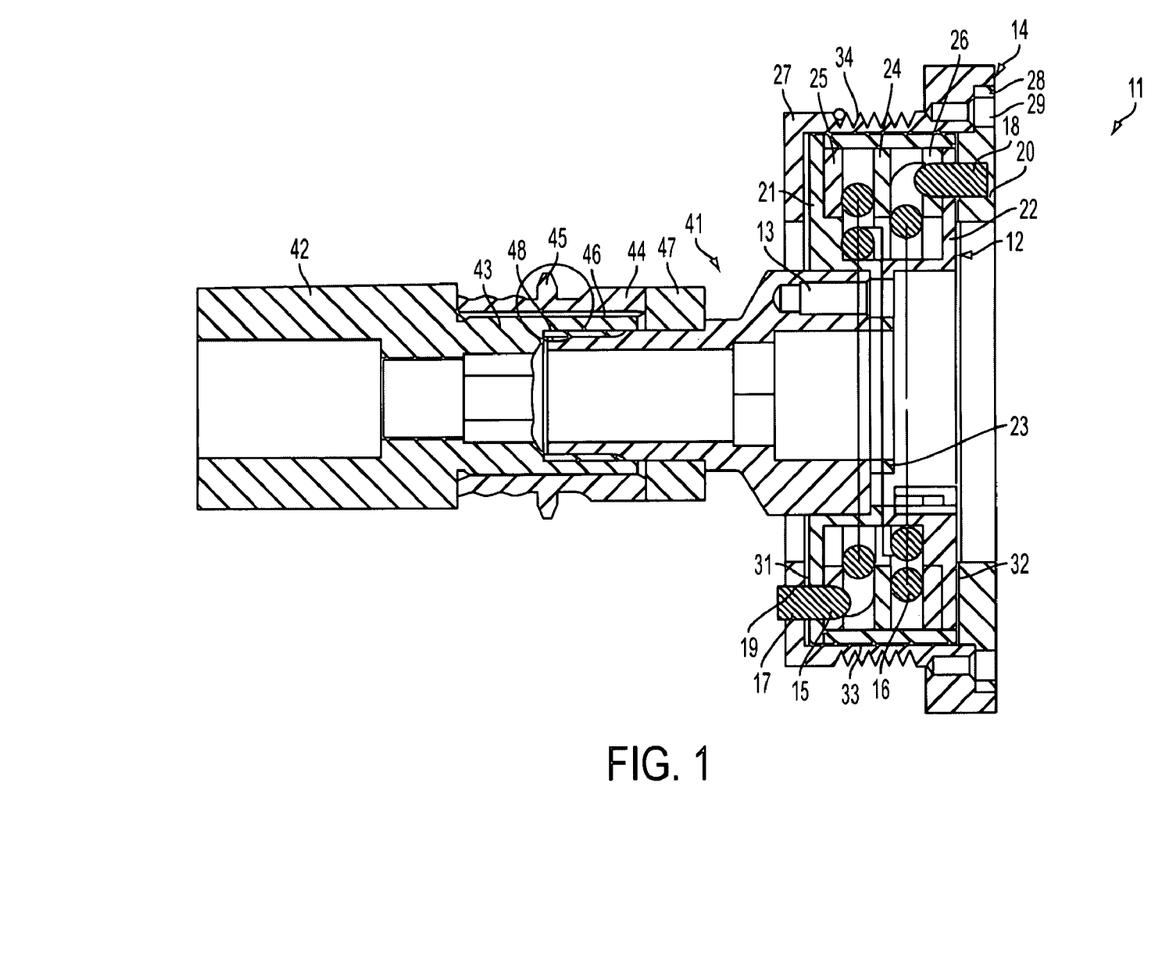
FIG. 1 illustrates a driving disc according to the invention in connection with a driveshaft in a longitude section.

In FIG. 1, a driving disc 11 is shown in a longitudinal section and connected to a threaded-on shaft journal 41 which, in turn, is threaded into a hollow shaft 42 shown in a broken-off condition. A sleeve 44 with a toothed pinion 45 is slid onto a stepped shaft end 43, with shaft teeth 46 constituting the torque connection. A spacing sleeve 47 is slid on between the sleeve 44 and the shaft journal 41. Clamping is effected via the part of threads 48 whose pitch is such that it tightens in the preferred driving direction of the driving disc 11. The driving disc 11 comprises a hub 12 which is threaded to the shaft journal 41 by threading means 13.

Furthermore, the driving disc 11 comprises a disc rim 14 which is connected to the hub 12 via two spiral-shaped wound wire springs in a rotationally elastic way. The wire springs 15, 16 are each wound into more than one winding to form a spiral and each comprise a bent end 17, 18 which, with respect to the direction of rotation, engages a bore 19, 20 in the disc rim 14.

The hub 12 is composed of a dish-shaped part 21 and a cover-like part 22, with the parts being connected to one another by the threading means 13. The hub thus has the shape of an annular cage with an inner flange 23 to be threaded to the shaft journal 41. The two wire springs 15, 16 are axially supported relative to one another via an intermediate disc 24 inserted into the hub 12, wherein the suitably selected surface of the intermediate disc is able to contribute towards damping the resilient spring movement in the form of an expanding or contracting movement.

Furthermore, two supporting discs 25, 26 can be inserted into the hub 12 which axially support the springs 15, 16 in the hub 12. These supporting discs 25, 26, can serve to influence the damping of the elastic spring movement. The disc rim 14, consists of a dish-shaped part 27 and a cover-like part 28 which are connected to one another via threading means 29. The disc rim 14 encloses the hub 12 at its ends and around its circumference. Between the end faces of the hub 12 and the inside of the disc rim 14 there are arranged friction-reducing sliding discs 31, 32 which, can serve to set or influence the damping properties of the driving disc 11.

Between the outer circumferential face of the hub 12 and the inner circumferential face of the disc rim 14 there is arranged a sliding or friction sleeve 33 which, on the one hand, serves to provide play-free support between the disc rim 14 and the hub 12 and, on the other hand serves to influence and select the damping properties of the entire driving disc. The inner ends of the wire springs 15, 16 are form-fittingly and positively supported in the circumferential direction on the hub 12. The two springs have to be mounted so as to be pretensioned relative on one another.

Figure 2A:
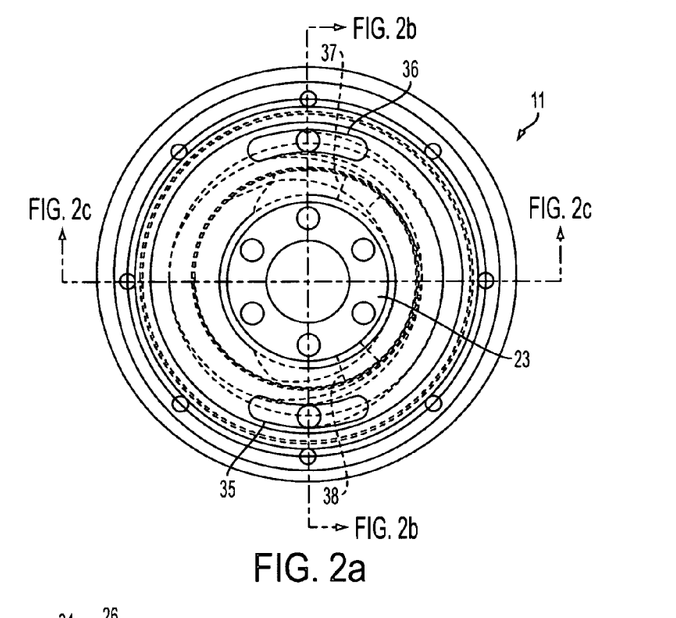
FIG. 2a illustrates a driving disc according to FIG. 1 in the form of a detail in an end view
Figure 2B:
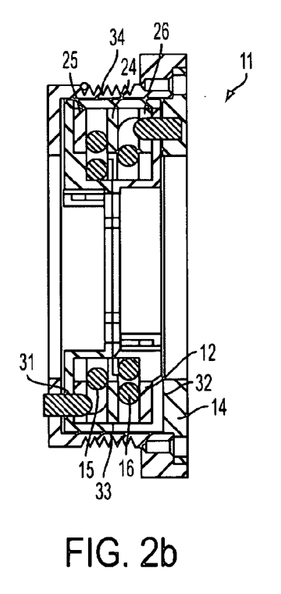
Figure 2C:
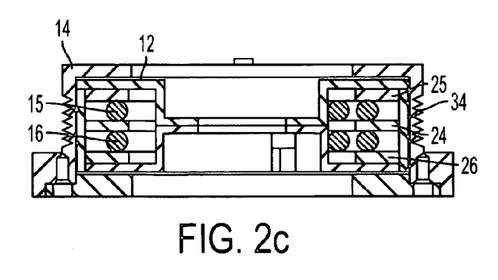
FIG. 2c illustrates a driving disc according to FIG. 1 in the form of a detail in a longitude section B-B according to FIG. 2b.

FIGS. 2a, 2b, and 2c show the driving disc 11 in several perspectives and any aspects identical to those shown in the preceding figure have been given the same reference number. To that extent, reference is made to the preceding description. With reference to FIG. 2a, the hub 12 is provided with two oblong holes 35, 36 which are arranged opposite one another and through which passes the ends 17, 18 of the wire springs 15, 16 secured in the bores 19, 20 without obstructing the relative rotational movement between the hub 12 and the disc rim 14. The respective inner ends of the wire springs are butt-cut and are supported on radial stops 37, 38 of the hub 12 which is pressed out of metal plate. The two wire springs are pretensioned relative to one another, i.e. they are radially expanded relative to the untensioned starting position. Upon each relative rotation between the hub 12 and the disc rim 14, one of the springs is also tensioned while the second spring is untensioned without being completely load-relieved, i.e. the contact with the respective rotational stop 37, 38 is to be maintained. Damping is effected via the internal material damping of the wire springs 15, 16 on the one hand and, on the other hand, via the relative surface friction between the wire springs and the discs 24, 25, 26 and, additionally between the hub 12 and the disc rim 14 at the sliding discs 31, 32 and at the sliding or friction sleeve 33. By suitably selecting the materials and surface qualities, setting of the damping effect can be highly accurate.

Figure 3:
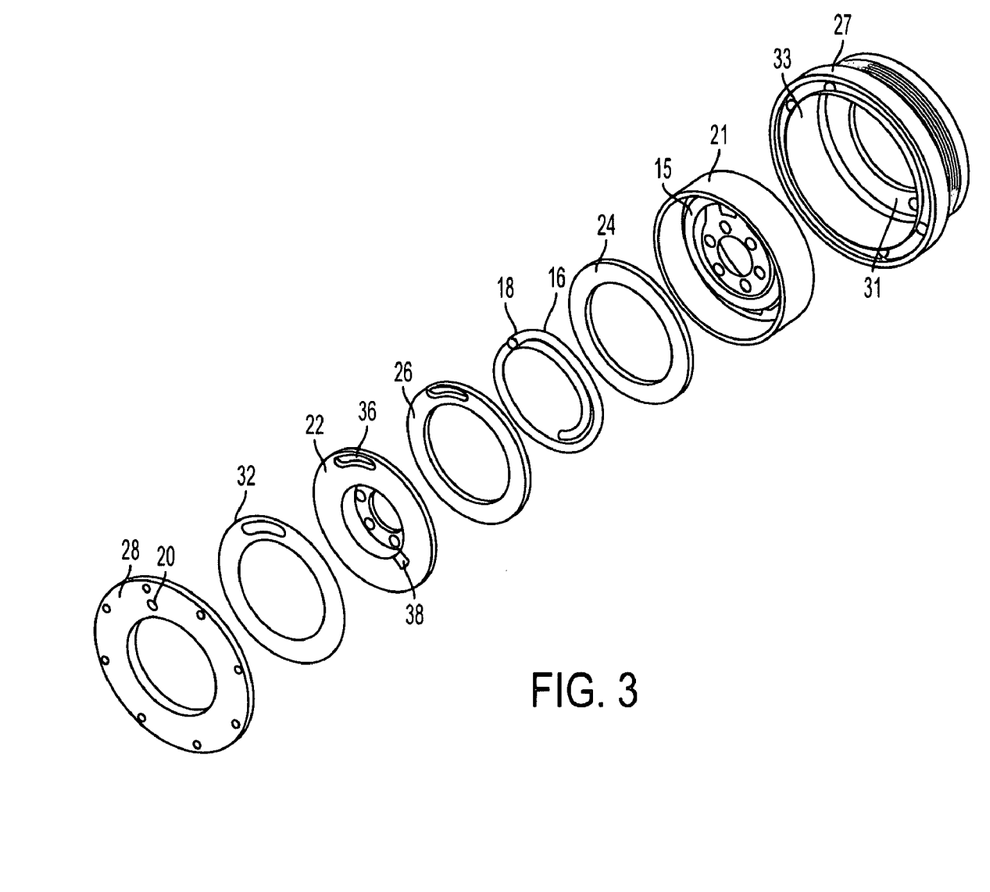
FIG. 3 illustrates a driving disc according to FIG. 2 in an exploded view.

FIG. 3 shows the driving disc according to FIGS. 2a, 2b and 2c in a unexploded view, with identical details again having been given the same reference numbers. From the front to the rear, the following details are shown: the cover 28 of the disc rim with the bore 20, the sliding disc 32, the cover 22 of the hub with the oblong hole 36 and the rotational stop 38, the supporting disc 26, the wire spring 16 with the broken-off end 18, the intermediate disc 24, the dish-shaped housing part 21 of the hub 12 with the inserted wire spring 15 as well as the dish-shaped housing part 27 of the disc rim into which the sliding or friction sleeve 33 and the sliding disc 32 are inserted. Thus, by axially mounting the basket-shaped hub member, consisting of parts 21 and 22, and mounting the disc rim, consisting of parts 27 and 28, the finished driving disc is provided.

Figure 4:
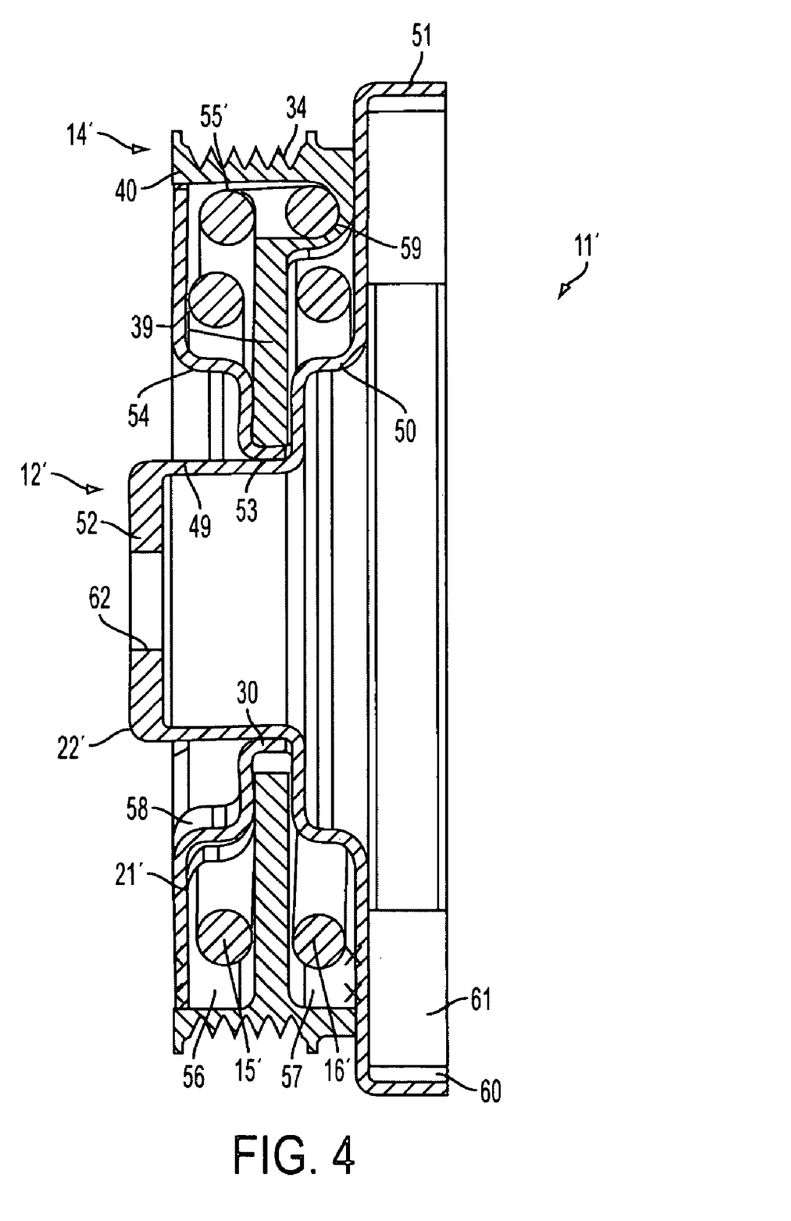
FIG. 4 illustrates a driving disc in second embodiment as a detail in a longitudinal section.

FIG. 4 shows a driving disc 11' in a longitudinal section. The driving disc 11' comprises a hub 12' which can be threaded to a shaft journal by threading means. Furthermore, the disc 11' includes a disc rim 14' which is rotationally and elastically connected to the hub 12' via two wire springs 15', 16' wound so as to be spiral-shaped. The wire springs 15', 16' are wound so as to be spiral-shaped into more than one winding and are form-fittingly self-supporting at one end in the direction of rotation at the disc rim 14'.

The hub 12' is composed of a dish-shaped part 21' and an annular-cover-shaped part 22', with the part being axially and rotationally fast connected to one another by being axially pressed into a press fit. The cover-shaped part 22' is slid onto the outside of the dish-shaped part 21'. The hub 12' forms an annular groove 55 with a stepped width and parallel flanks. The dish-shaped part 21' is a plate metal part having a wall of approximately constant thickness, but with a thickened base. It also contains three steps and three cylindrical portions 49, 50, 51. If viewed from the right, the part is undercut-free. Specifically, it can be provided in the form of a deep-drawn part. The dish-shaped part 21' comprises a base 52 in the form of an inner flange which can be used for being threaded to a shaft journal.

On the outside of the base 52, i.e. on the left, end teeth are formed thereon which can cooperate with corresponding end teeth of the shaft journal. A through-aperture 62 can receive a central screw. The cylindrical portion 49 can serve as a seat for the cover-shaped part 22'. The cover-shaped part 22' is also provided in the form of a plate metal part with an approximately constant wall thickness; and comprising two steps and two cylindrical portions 53, 54. If viewed from the left, the annular-cover-shaped part 22' is undercut-free and can be produced as a deep-drawn part. Part 22' is positioned by means of the cylindrical portion 53 with the smaller diameter on the smallest cylindrical portion 49 of the dish-shaped part 21' and, together form the annular grove 55 which provide a narrower, deeper part and a wider, less deep part.

The wire springs 15', 16' and, therebetween, the integrally produced disc rim 14' are inserted axially between the two wire springs such as before the parts 21' and 22' are joined together. The disc rim 14' comprises an approximately centrally positioned radial guiding disc 39 and a cylindrical ring 40 which forms the belt seat 34. The guiding disc 39 is guided in the deeper narrower part of the annular groove 55 of the hub 12' by means of a sliding or friction sleeve 30 with a U-shaped cross-section. At the same time, the guiding disc 39 and the hub 12' form two annular chambers 56, 57 for the two wire springs 15', 16'. At the cover-shaped part 22' of the hub 12', an inner rotational stop 58 is formed of plate metal for the wire spring 15', and an outer rotational stop 59 for the wire spring 16' is formed onto and out of the disc rim 14'. In the other annular chamber, a further outer rotational stop for the wire spring 15' is provided as well as a further inner rotational stop for the wire spring 16', which are circumferentially offset.

Both wire springs 15', 16' are pretensioned relative to one another, i.e. they have to be radially expanded relative to their untensioned starting position. With each relative rotation between the hub 12' and the disc rim 14', one of the springs is tensioned and the second spring is untensioned without being completely load-relieved, i.e. the pretensioned contact with the respective rotational stop 58, 59 is to be maintained. Damping is effected via the internal material damping effect of the wire springs 15', 16' on the one hand and, on the other hand, via the relative surface friction between the guiding disc 39 of the disc rim 14' and the annular groove 55 in the hub 12'. As discussed, the damping effect is set according to the properties and the type of assembly of the sliding or friction sleeve 30.

Furthermore, in the largest cylindrical portion 51 of the dish-shaped part 21', an annular absorber mass 61 is provided which can be vulcanized in a damping rubber 60, and is capable of rotational vibrations relative to the hub 12' for the purpose of absorbing high-frequency vibrations, In this way, shaft journal vibrations can be effectively be isolated from the disc rim 14'.

Figure 5A:
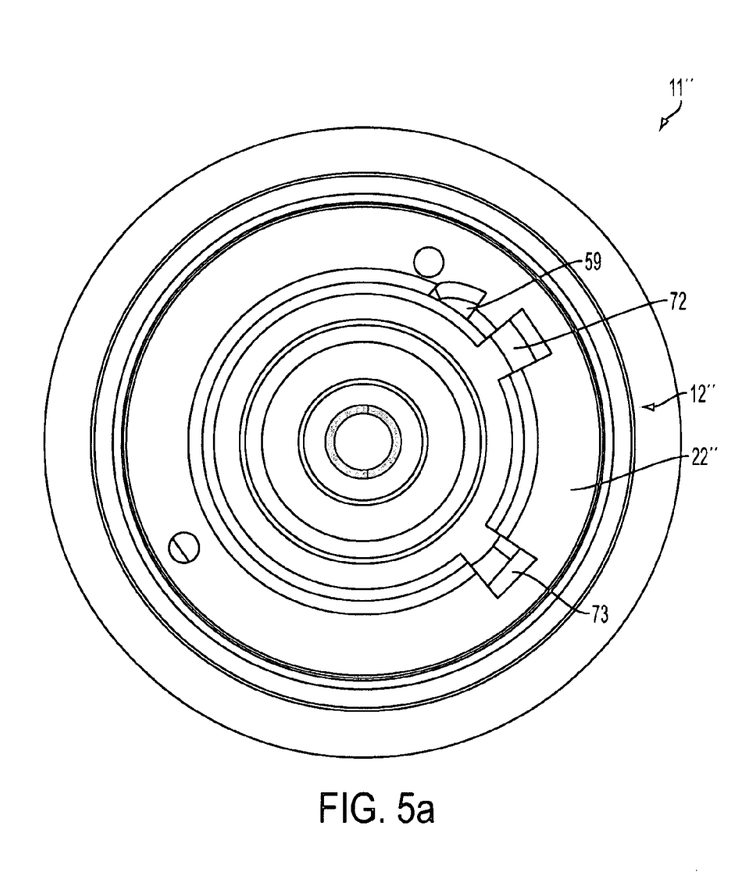
FIG. 5a illustrates a driving disc in a third embodiment in the form of a detail in an end view.
Figure 5B:
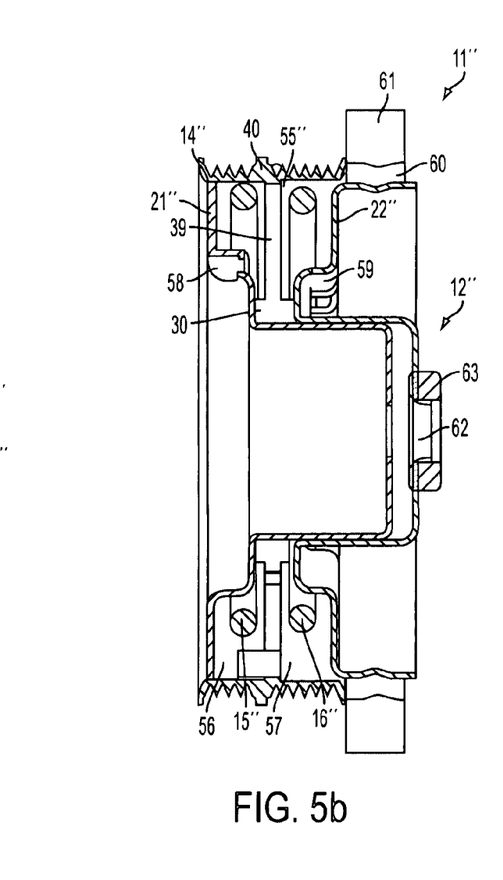

FIG. 5 shows a driving disc 11" in an axial view and in a longitudinal section. The driving disc 11" comprises a hub 12" which can be threaded to a shaft journal 41 by threading means. Furthermore, the disc 11" including a disc rim 14" which is rotationally and elastically connected to the hub 12" via two wire springs 15", 16" wound so as to be spiral-shaped. The wire springs 15", 16" are wound so as to be spiral-shaped into more than one winding and they are wound in opposite directions. Furthermore, each of said wire springs 15", 16" is form-fittingly self-supporting by a cut-off end in the direction of rotation at the disc rim 14".

The hub 12" is composed of a first dish-shaped part 21", and a second dish-shaped part 22", with the parts being axially and rotationally fast connected to one another by being axially pressed into a press fit. The first dish-shaped part 21" is slid in the inside into the second dish-shaped part 22". The hub 12" forms an annular groove 55" with a stepped width and parallel flanks. The dish-shaped part 21" is a plate metal part having a wall of approximately constant thickness. The dish-shaped part 21" contains several steps and two cylindrical portions. The dish-shaped part 21" is axially undercut-free. Specifically, it can be provided in the form of a deep-drawing part. For reinforcing purposes, a centrally positioned disc 63 is placed onto the dish-shaped part 22". A through-aperture 62 can receive a central screw. The inner cylindrical portion of the first dish-shaped part 21" can serve as an outer seat for the second dish-shaped part 22".

The second dish-shaped part 22" is also provided in the form of a plate metal part having a wall of approximately constant thickness. It also comprises several steps and three cylindrical portions. The second dish-shaped part 22" is also axially undercut-free and can also be produced as a deep-drawn part. The part 22" is positioned by means of the cylindrical portion with the smallest diameter on the smallest cylindrical portion of the first dish-shaped part 21" and, together form the annular groove 55 which provides a narrower, deeper part and a wider, less deep part.

The wire springs 15", 16" and, therebetween, the integrally produced disc rim 14" are inserted axially between the two wire springs, such as before the parts 21" and 22" are joined together. The disc rim 14" comprises an approximately centrally positioned radial guiding disc 39 and a cylindrical ring 40 which forms the belt seat 34. The guiding disc 39 is guided in the deeper narrower part of the annular groove 55 of the hub 12" by means of sliding or friction sleeve 30 with a U-shaped cross-section. At the same time, the guiding disc 39 and the hub 12" form two annular chambers 56, 57 for the two wire springs 15", 16". At the first cover-shaped part 21" of the hub 12", an inner rotational stop 58 is formed of plate metal for the wire spring 15". A further inner rotational stop 59 and two guiding eyes 72, 73 for the wire spring 16" are provided at the other part 22". Each of these parts, i.e. the rotational stop 58 and the guiding eyes 72, 73 can be punched out of plate metal. Accordingly, a rotational stop and guiding eyes are also provided at part 21", however of said parts only the rotational stop 59 for the wire spring 16" can be seen in FIG. 5. The guiding eyes 70, 71 of the first dish-shaped part can be seen in FIG. 6.

In one embodiment, both wire springs 15", 16" are pretensioned relative to one another, i.e. they are radially expanded relative to their untensioned starting position. With each relative rotation between the hub 12" and the disc rim 14", one of the springs is tensioned and the second spring is untensioned without being completely load-relieved, i.e. the pretensioned contact with the respective rotational stop 58, 59 is to be maintained. Damping is effected via the internal material damping effect of the wire springs 15", 16" on the one hand and, on the other hand, via the relative surface friction between the guiding disc 39 of the disc rim 14" and the annular groove 55 in the hub 12". As discussed, the damping effect is set according to the properties and the type of assembly of the sliding or friction sleeve 30.

Furthermore, on the largest cylindrical portion of the dish-shaped part 22", an annular absorber mass 61 is provided which can be vulcanized in a damping rubber 60 and is capable of rotational vibrations relative to the hub 12" for the purpose of absorbing high-frequency vibrations. In this way, any vibrations of a shaft journal can be effectively isolated from the disc rim 14".

Figure 6:
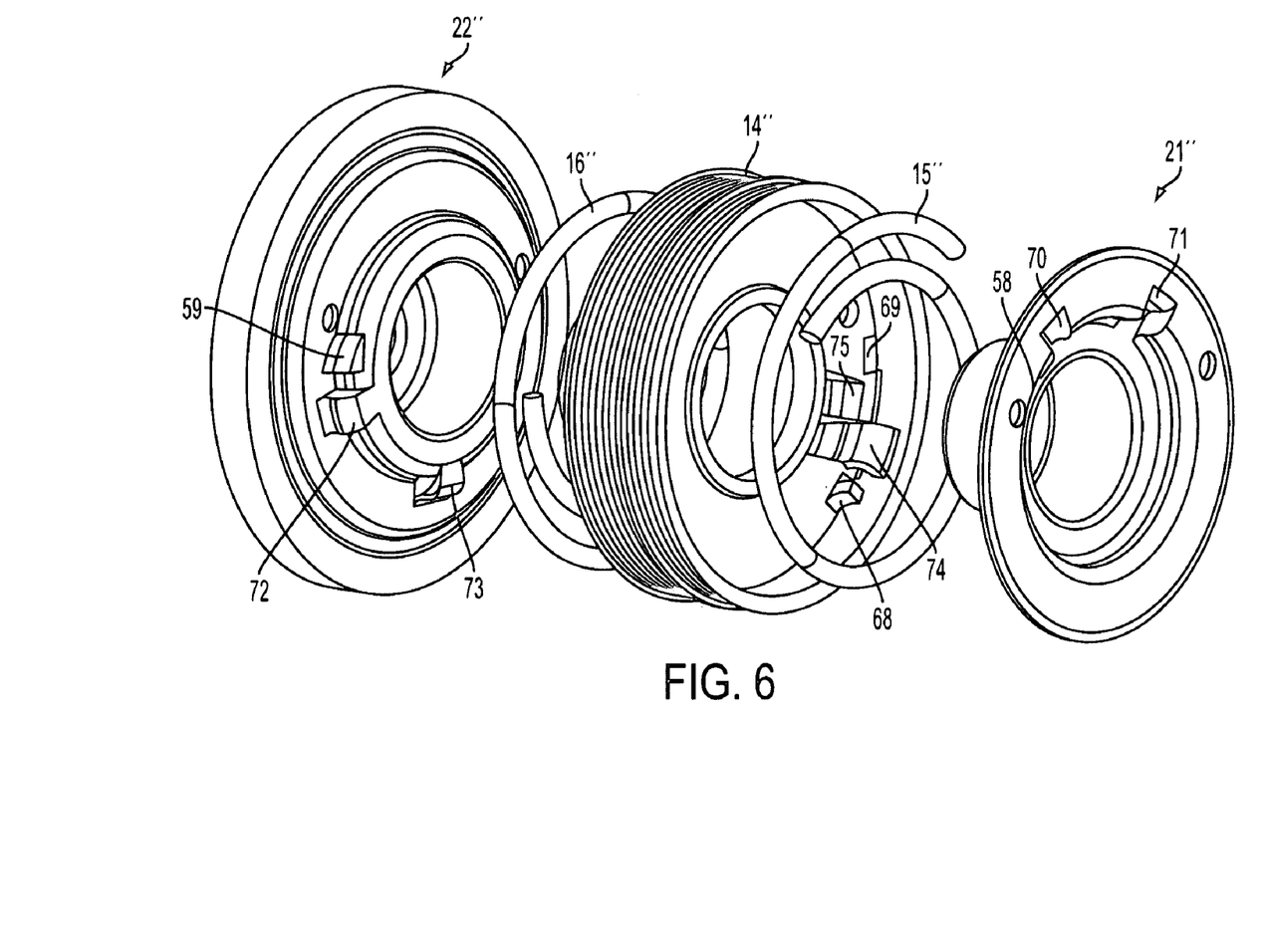
FIG. 6 illustrates a driving disc according to FIG. 5 in an exploded view

FIG. 6 shows the driving disc according to FIG. 5 in an exploded view, with identical details again having been given the same reference numbers. From the right hand side to the left hand side, the following details can be identified: the dish-shaped housing part 21", the wire spring 15", the disc rim 14", the wire spring 16" as well as the dish-shaped housing part 22". At the housing part 21", the punched-out inner rotational stop 58 is shown for the wire spring 15" as well as two punched-out guiding eyes 70, 71 through which the wire springs are guided laterally, and providing a radial play of movement. From the rear, an outer rotational stop 69 is provided at the disc rim 14" as well as a guiding eye 75 for the wire spring 15". In a plan view, an inner rotational stop 68 is shown as well as a guiding eye 74 for the wire spring 15", and guiding eyes 72 and 73 for the wire spring 16". All three parts 21", 22" and 14" can be formed of plate metal parts, with the cylindrical ring 40 at the disc rim 14" being produced from a radially split outer edge of a blank. Thus, a driving disc is provided by an axial mounting of the hub member from parts 21" and 22" inside the disc rim 14" while enclosing the wire springs 15", 16'".

The invention claimed is:

1. A driving disc comprising
a hub and a disc rim which are rotatably supported inside one another, and at least two wound wire springs which are mounted substantially coaxially relative to the hub and disc rim,
wherein a first end of said wire springs is secured in the direction of rotation relative to the hub and
wherein a second end of said wire springs is secured in the direction of rotation relative to the disc rim wherein the at least two wound wire springs are wound in opposite directions and are mounted so as to be pretensioned relative to one another, and
wherein the at least two wire springs are each wound in a spiral manner in one plane.

2. A driving disc according to claim 1, wherein the at least two wire springs are supported at their respective ends on the hub and on the disc rim each in a circumferential direction.

3. A driving disc according to claim 1, wherein at least one of the ends of the at least two wire springs is bent in an axis-parallel with respect to the hub and disc rim.

4. A driving disc according to claim 1, wherein at least one of the ends of the at least two wire springs is butt-cut and is supported on a rotational stop.

5. A driving disc according to claim 1, wherein the hub further comprises a dish-shaped part and a cover, and encloses two wound wire springs wherein the one ends of the wire springs pass through the hub with circumferential play and are connected to the disc rim.

6. A driving disc according to claim 5, wherein the hub further comprises oblong holes through which passes the one ends of the wire springs.

7. A driving disc according to claim 5, wherein the wire springs are axially supported on one another by an intermediate disc inserted into the hub.

8. A driving disc according to claim 5, wherein the wire springs are axially supported in the hub by supporting and sliding discs inserted into the hub.

9. A driving disc according to claim 1, wherein the disc rim further comprises a dish-shaped part and a cover and encloses the hub at its end faces and at the circumference.

10. A driving disc according to claim 9, wherein sliding discs are provided between the end faces of the hub and the disc rim.

11. A driving disc according to claim 9, wherein a sliding sleeve is provided between the circumference of the hub and the disc rim.

12. A driving disc according to claim 9, wherein a friction sleeve is provided between the circumference of the hub and the disc rim.

13. A driving disc according to claim 1, wherein the hub further comprises a dish-shaped part and an annular-cover-shaped part, wherein the annular-cover part is positioned on the outside of the dish-shaped part in such a way that the hub forms an annular groove in which the wire springs are positioned and in which the disc rim is guided.

14. A driving disc according to claim 13, wherein the disc rim further comprises a guiding disc which engages the annular groove of the hub, and a cylindrical ring which, together with the hub, forms two annular chambers which are separated from the guiding disc.

15. A driving disc according to claim 13, wherein at least one sliding sleeve is provided between the hub and the disc rim, and wherein the sliding sleeve, encloses the guiding disc.

16. A driving disc according to claim 13, wherein at least one friction sleeve is provided between the hub and the disc rim, and wherein the friction sleeve, encloses the guiding disc.

17. A driving disc according to claim 1, wherein the hub further comprises a first dish-shaped part and a second dish-shaped part, having two cylindrical regions inserted into one another, and wherein the hub forms an annular groove in which the wire springs are positioned and in which the disc rim is guided.

18. A driving disc according to claim 1, wherein the at least two wire springs are wound out of round wire.

19. A driving disc according to claim 1, wherein a shaft journal is threaded on to the hub.

20. A driving disc according to claim 1, wherein an inner flange of the hub is provided with end teeth, and wherein the shaft journal is provided with counter teeth.

21. A driving disc according to claim 1, wherein an absorber mass capable of vibrating relative to the hub is connected to the hub by means of a damping rubber.

22. A driving disc according to claim 1, wherein at least one of the ends of the at least two wire springs is bent in a radial way with respect to the hub and disc rim.

23. A driving disc according to claim 1, wherein the hub further comprises a two dish-shaped parts, and encloses two wound wire springs wherein the one ends of the wire springs pass through the hub with circumferential play and are connected to the disc rim.

\* \* \* \* \*